United States Patent [19]
Deininger

[11] Patent Number: 6,076,350
[45] Date of Patent: Jun. 20, 2000

[54] HYDROSTATIC DRIVE SYSTEM FOR A VEHICLE

[75] Inventor: Horst Deininger, Hörstein-Alzenau, Germany

[73] Assignee: Linde Aktiengesellschaft, Germany

[21] Appl. No.: 09/158,768

[22] Filed: Sep. 23, 1998

[30] Foreign Application Priority Data

Sep. 24, 1997 [DE] Germany ............................ 197 42 188
Oct. 17, 1997 [DE] Germany ............................ 197 46 090

[51] Int. Cl.$^7$ ............................................. F16D 31/02
[52] U.S. Cl. ................................ 60/422; 60/423; 60/431; 60/435; 60/450; 60/452
[58] Field of Search ............................. 60/422, 427, 431, 60/435, 450, 452, 423

[56] References Cited

U.S. PATENT DOCUMENTS

| | | | |
|---|---|---|---|
| 2,892,312 | 6/1959 | Allen et al. .............................. | 60/427 |
| 3,579,987 | 5/1971 | Busse ..................................... | 60/422 |
| 4,145,958 | 3/1979 | Ille ...................................... | 60/484 X |
| 4,293,284 | 10/1981 | Carlson et al. .......................... | 60/450 X |
| 4,642,984 | 2/1987 | Dixen ................................... | 60/427 |
| 4,823,551 | 4/1989 | Hehl ..................................... | 60/422 |
| 4,966,066 | 10/1990 | Kauss et al. ............................ | 60/422 X |
| 5,079,919 | 1/1992 | Nakamura et al. ........................ | 60/426 |
| 5,083,430 | 1/1992 | Hirata et al. ........................... | 60/445 |
| 5,129,229 | 7/1992 | Nakamura et al. ........................ | 60/452 |
| 5,129,230 | 7/1992 | Izumi et al. ............................ | 60/450 |
| 5,155,996 | 10/1992 | Tatsumi et al. .......................... | 60/431 |
| 5,168,705 | 12/1992 | Hirata et al. ........................... | 60/452 |
| 5,293,746 | 3/1994 | Bianchetta ............................. | 60/435 |
| 5,438,832 | 8/1995 | Yonekubo et al. ....................... | 60/449 |

*Primary Examiner*—John E. Ryznic
*Attorney, Agent, or Firm*—Webb Ziesenheim Logsdon Orkin & Hanson, P.C.

[57] ABSTRACT

A hydrostatic drive system is provided for a vehicle, in particular an industrial truck, with a hydrostatic traction drive system (16), a hydraulic work system (13) and a hydraulic steering system (9). The invention provides a drive system that is compact and exhibits improved operating behavior during the change from traction operation to coasting operation. To supply the traction drive system (16), the hydraulic work system (13) and the steering system (9), there is a hydraulic pump (1) with an adjustable delivery volume that works in the open circuit, which pump (1) discharges into a delivery line (5), in which there is a traction drive control valve (19) for the pressurization of the traction drive system, which is connected to an outlet line (22) leading to a reservoir, and which can be connected to delivery lines (20a, 20b) leading to the traction drive system (16), whereby in both the delivery line (5) and in the outlet line (22) there are respective flow regulators (23, 24), each of which can be pressurized by the pressure upstream of the choke point of the traction drive control valve (19) in the closing direction, and by the pressure downstream of a throttle point of the traction drive control valve (19) and by a spring in the opening direction. In one embodiment of the invention, a delivery branch line (5a) branches off from the delivery line (5) upstream of the flow regulator (24) and can be brought into communication with the steering system (9) and the hydraulic work system (13).

35 Claims, 3 Drawing Sheets

HYDROSTATIC DRIVE SYSTEM FOR A VEHICLE

BACKGROUND OF THE INVENTION

1. Field of the Invention

The invention relates generally to a hydrostatic drive system for a vehicle, such as an industrial truck having a hydrostatic traction drive system, a hydraulic work system and a hydraulic steering system.

2. Description of the Prior Art

On known hydrostatic drive systems for a vehicle, such as for a fork-lift or a wheel loader, the hydrostatic traction drive system generally has an adjustable-delivery pump and at least one traction drive motor connected to the pump in a closed circuit. To provide power to the hydraulic work system, there is an additional pump with a constant delivery volume which is operated in an open circuit and sucks hydraulic fluid from a reservoir and, when the hydraulic work system is not in operation, returns the hydraulic fluid to the reservoir. The steering system is supplied with hydraulic fluid by an additional pump that also has a constant delivery volume and is operated in an open circuit. This pump can also be used to supply control functions, for example, for a parking brake or a control device that pressurizes the adjustment device of the drive system pump.

On such drive systems, therefore, a plurality of pumps, for example three, are required to supply the traction drive system, the steering system and the hydraulic work system with hydraulic fluid. The drive system therefore takes up a great deal of space. Additionally, all the pumps are continuously driven by a drive motor, although as a rule only one or two pumps are used simultaneously during the operation of the vehicle. This results in corresponding idle losses which in turn result in a low efficiency for the drive system. The continuous operation of all the pumps also results in unnecessary wear.

There are also problems which occur with a traction drive system operated in a closed circuit. For example, during the operation of the traction drive system, leaks occur at the pump and the traction drive motor from the high-pressure side to the low-pressure side of the hydraulic circuit. As a result of conventional measures adopted on the pump to reduce pulsations, the leakage of the pump generally exceeds the leakage at the traction drive motor.

If the traction drive system is in traction operation and if the pump is being operated at a specified setting of the delivery volume and speed, there is a volume current that, at a specified intake volume setting of the traction drive motor, corresponds to a setpoint speed of the traction drive motor and thus to a setpoint speed of the vehicle. As a result of the leakage at the pump and the traction drive motor, however, only the volume current of the pump minus the leakage of the pump and the traction drive motor can be converted into a speed of the traction drive motor. The speed on the traction drive motor is therefore lower than the setpoint speed by the magnitude of the leakage. In traction operation, therefore, the actual speed of travel of the vehicle is generally lower than the setpoint speed of the vehicle set at the pump due to the leakage that occurs at the pump and the traction drive motor.

If the setting of the pump and of the traction drive motor is unchanged and the vehicle travels down a steep slope, the traction drive system switches over into a coasting operation. The traction drive motor begins to function as a pump and the pump begins to function as a motor. As a result, the high-pressure side and the low-pressure side of the hydraulic circuit are reversed and the traction drive motor delivers hydraulic fluid to the pump. The speed set at the traction drive motor is thereby a speed that is higher than the setpoint speed of the traction drive motor set at the pump by the leakage of the pump and the traction drive motor. The speed of travel of the vehicle is therefore a speed that is higher than the speed set at the pump by the magnitude of the leakage that occurs at the traction drive motor and the pump. Therefore, when the vehicle switches from traction operation to coasting operation, there is an increase in the speed of the vehicle that corresponds to twice the leakage on the traction drive motor and the pump. Because the leakage of the pump is thereby greater than the leakage of the traction drive motor, the speed increase of the vehicle when it switches from traction to coasting is essentially determined by the leakage of the pump.

The increase in speed when a vehicle equipped with a closed traction drive system switches from traction to coasting operation is even greater because the pump that is functioning as a motor is driven by the traction drive motor that is functioning as a pump. Therefore, energy is fed into the output side of the drive motor. The speed of the drive motor is thereby increased, as a result of which the pump functioning as a motor is operated at a higher speed. Thus, the traction drive motor can also be operated at a higher speed. The speed of the vehicle when it switches from traction to coasting operation therefore also increases as a result of the speeding up of the drive motor.

The increase in the speed of the drive motor also results in an increase in the level of noise and vibrations generated. Because the braking action continues to be governed by the braking moment that can be absorbed by the drive motor, the braking effect can be too great when the vehicle is empty. On the other hand, when the vehicle is fully loaded, the braking moment of the drive motor may not be sufficient to decelerate the vehicle, as a result of which the braking action is poor and the drive motor is speeded up to undesirably high speeds.

Therefore, it is an object of the invention to provide a drive system that is compact and in which the switchover from traction to coasting operation is improved.

SUMMARY OF THE INVENTION

The invention teaches that this object can be accomplished if there is one hydraulic pump with an adjustable delivery volume operating in an open circuit to supply the traction drive system, the hydraulic work system and the steering system. The pump discharges into a delivery line in which there is a traction drive control valve to pressurize the traction drive system. The traction drive control valve is connected to an outlet line leading to a reservoir and can be brought into flow communication with delivery lines leading to the traction drive system, such that in both the delivery line and in the outlet line there are respective flow regulators that can each be pressurized in the closing direction by the pressure upstream of the throttle point of the traction drive control valve and in the opening direction by the pressure downstream of the throttle point of the traction drive control valve and a spring. As a result of the use of a single pump for the simultaneous supply of the traction drive system, the hydraulic work system and the steering system, and thus the elimination of additional pumps, less space is required. The use of only one pump with an adjustable delivery volume also makes it possible to adjust the delivery current or flow of the pump to meet the delivery requirements of the users in corresponding operating situations, which results in an improved utilization of energy.

The traction drive control valve located in the delivery line of the pump makes it possible in a simple manner to operate the traction motors in both directions, and thus to move the vehicle forward and backward. As a result of the operation of the traction motors in the open circuit, the traction motors are isolated from the pump in coasting operation, as a result of which the leakage of the pump and the increase in the speed of the prime mover when the vehicle switches from traction to coasting operation does not result in any increase in the speed of the vehicle. The flow regulators at the inlet and outlet of the traction drive control valve, each of which is controlled by the pressure difference at the throttle point that is formed by the inlet orifice or the outlet orifice, respectively, of the traction drive control valve, make it possible for the speed of travel of the vehicle to correspond to the speed of travel set at the throttle point of the traction drive control valve. The inlet-side flow regulator located in the delivery line causes the vehicle to retain the speed of travel set at the inlet orifice of the traction drive control valve when the pressure in the delivery line changes as a result of the actuation of additional users, such as the hydraulic work system or the steering system. When the vehicle is traveling downhill, the traction motors, on account of the flow regulator located in the outlet line, can only deliver the hydraulic fluid current set on the outlet orifice. The outlet-side flow regulator builds up a braking pressure, as a result of which the vehicle is decelerated. The vehicle thereby retains the speed of travel set at the outlet orifice of the traction drive control valve. As a result of the isolation of the traction motors from the pump in coasting operation, the speed of the drive motor is not increased, another result of which is that no additional noise is generated. The deceleration is governed by the flow regulator located in the outlet line and is therefore independent of the braking moment of the drive motor.

In one embodiment of the invention, the traction drive control valve is realized in the form of a throttling, spring-centered directional control valve with a closed middle position. Depending on its position, the traction drive control valve opens an inlet orifice and an outlet orifice. Such a traction drive control valve makes it possible, in a simple manner, to control the speed and the direction of travel of the vehicle.

The inlet orifice and the outlet orifice of the traction drive control valve are preferably substantially the same size. It thereby becomes possible, in a simple manner, for the traction motors to be fixed firmly between the flow regulators, and thus the vehicle retains the speed set at the traction drive control valve if the pressure in the delivery line increases on account of other users or a change from traction to coasting operation, such as during downhill travel or when the vehicle is braked.

It is particularly advantageous if a precision control range is provided on the traction drive control valve, in which the outlet orifice is smaller than the inlet orifice of the traction drive control valve in response to a small modulation of the traction drive control valve. As a result, there is a bias in the traction drive system, which means that a precise control of the vehicle becomes possible at low speeds of travel.

To minimize the losses at higher speeds of travel, the invention teaches that in the range of the maximum deflection of the traction drive control valve, the outlet orifice of the traction drive control valve can be larger than the inlet orifice of the traction drive control valve.

It is particularly advantageous if, upstream of the flow regulator, a branch delivery line branches off from the delivery line and can be connected to the steering system and the hydraulic work system. The steering system and the hydraulic work system are therefore supplied by a secondary current. Consequently, the pump can be used with little added construction effort and expense to supply the hydraulic work system and the steering system.

In one configuration of the invention, the flow regulator located in the delivery line can be pressurized in the closing direction as a function of the actuation of the hydraulic work system and/or of the steering system. Consequently, under operating conditions in which, in addition to the traction drive system, the hydraulic work system and/or the steering system is actuated, and the quantity of hydraulic fluid demanded by the users exceeds the quantity of hydraulic fluid that can be delivered by the pump, the quantity of hydraulic fluid flowing from the pump to the traction drive control valve can be reduced. It thereby becomes possible to prevent a shortage of hydraulic fluid in the hydraulic work system and in the steering system. The hydraulic work system and the steering system are thus supplied with hydraulic fluid on a priority basis. The pressure compensator located in the delivery line thereby simultaneously acts as a priority valve for the hydraulic work system and the steering system, which means that there is no need for a priority valve located in a branch delivery line branching off the delivery line. The pressure losses that occur in the delivery line from the pump to the drive motors are therefore small, which means that the drive system can be operated with low losses.

It is particularly advantageous if, in the delivery branch line, there is a priority valve for the steering system that, in a first switching position, connects the delivery branch line with an inlet line of the steering system, and in a second switching position connects it with the inlet line of the steering system and an inlet line of the hydraulic work system. The priority valve can be pressurized in the direction of the first switching position by a spring and the load pressure of the steering system, which is preferably realized in the form of a load-sensing steering system, and in the direction of the second switching position by the pressure in the inlet line of the steering system. Due to the presence of the priority valve, the steering system, which is a safety-relevant component, is provided with a priority supply of hydraulic fluid before the hydraulic work system. Under operating conditions in which, in addition to the traction drive system, the hydraulic work system and the steering system are actuated and the current of hydraulic fluid required by the users exceeds the delivery current that can be supplied by the pump, first priority is therefore given to supplying the steering system, which is a safety-relevant component.

It is particularly advantageous if there is a pressure reducing valve in the delivery branch line, upstream of the priority valve for the steering system. The pressure reducing valve can limit the pressure in the delivery branch line. It is thereby possible to isolate the delivery branch line from the high pressure of the delivery line leading to the traction drive system and to reduce it to conventional pressure levels for the hydraulic work system and the steering system. The components of the hydraulic work system and the steering system used in the delivery branch line can thereby be designed for operation at conventional pressure levels. The pressure reducing valve also acts as a maximum pressure relief valve for the hydraulic work system, which means that a relief valve in the work system circuit is no longer necessary.

In one embodiment of the invention, in a hydrostatic drive system with a feeder device for the hydrostatic traction drive system, a feed line for the feeder device is connected to the inlet line of the hydraulic work system or of the delivery branch line. A feeder device for the traction drive system ensures that oil leaks on the traction drive motors are made up, and thus cavitation is prevented. Because the feed oil for the drive circuit is taken from the delivery branch line or the inlet line of the hydraulic work system, the hydraulic work system is supplied with hydraulic fluid only after the steering system and the feeder device. The invention thereby guarantees that sufficient hydraulic fluid is available in the feeder device to prevent cavitation in the traction drive motors.

It is particularly advantageous if the feed line has a pressure reducing valve. The pressure in the feed line can thereby be limited to a conventional level that is less than the pressure in the inlet line of the hydraulic work system.

Furthermore, it is particularly advantageous if there is a demand flow regulator that controls or influences a flow volume adjustment device of the pump, and can be pressurized in the direction of a reduction of the delivery current by the pressure in the delivery line, and in the direction of an increase in the delivery current by the highest load pressure signal of the traction drive system, the hydraulic work system and the steering system. The discharge of the pump can thereby be adjusted in a simple manner to meet the hydraulic fluid demand of the traction drive system, the hydraulic work system and the steering system.

In one embodiment of the invention, in the outlet line of the traction drive control valve, downstream of the flow regulator, there is a valve that, in a first switching position, connects the outlet line with the reservoir and in a second switching position connects the outlet line with the feed line, whereby the valve can be pressurized in the direction of the second switching position by a spring and in the direction of the first switching position by the pressure in the feed line. As a result of the presence of the valve, if the traction drive system is under-supplied with hydraulic fluid, i.e. in an operating condition in which less hydraulic fluid is flowing into the inlet line of the traction motors than corresponds to the quantity of hydraulic fluid set by the inlet cross section of the traction drive control valve, and thus the feed device supplements the missing quantity of hydraulic fluid on the inlet side, the outlet line can be connected with the feed line. Thus the hydraulic fluid flowing back to the outlet line can flow into the inlet side of the traction drive system via the feeder device. During such an operating condition, the traction drive system is in a freewheeling state, in which the propulsion of the vehicle is reduced and the vehicle is rolling as a result of its kinetic energy. Such an operating condition can occur, for example, during the transition of the traction drive system from traction operation to coasting operation, whereby the traction drive motors require more hydraulic fluid on the inlet side than is supplied by the pump, and the replenishing valves supplement the missing quantity of hydraulic fluid on the inlet side. Such operating conditions can occur when the vehicle is traveling downhill or when additional users, such as the hydraulic work system and the steering system, are being pressurized simultaneously.

In one embodiment of the invention, the traction drive control valve can be actuated hydraulically, whereby control pressure branch lines lead to the control surfaces of the traction drive control valve, in each of which there is a pressure reducing valve, and generate a control pressure as a function of the deflection of an actuator element. It is thereby possible, in a simple manner, to actuate the traction drive control valve as a function of the deflection of an actuator element, such as a pedal.

The control pressure branch lines are appropriately connected to a control pressure line which is connected to the delivery branch line downstream of the pressure reducing valve. The hydraulic fluid for the actuation of the traction drive control valve is thus taken from the delivery branch line before the steering system.

It is particularly advantageous if the control pressure branch lines are connected to a control pressure line that is connected to the feed line downstream of the pressure reducing valve. The pressure level in the feed line is thereby available in the control pressure line, which means that less effort and expense is required for construction of the system, because there is no need for an additional pressure reduction in the control pressure line.

In one embodiment of the invention, there is a parking brake device of the traction drive system that has a parking brake valve and a brake line leading to the parking brake device, whereby the parking brake device can be released by the pressure in the brake line. The parking brake device can be realized in the form of a spring-loaded brake, for example. As soon as the parking brake has been actuated and there is a pressure in the brake line, the vehicle can be operated by means of the traction drive system.

It is particularly advantageous if the parking brake valve can be actuated by means of an actuator element and is located in the control pressure line, whereby the brake line is connected to the control pressure line downstream of the parking brake valve. The hydraulic fluid for the release of the parking brake device is thus taken from the control circuit of the traction drive control valve.

In a first switching position, the parking brake valve appropriately connects the control pressure line with the control pressure branch lines and the brake line, and in a second switching position connects the control pressure branch lines and the brake line with a reservoir. Consequently, when the parking brake is actuated and thus the brake line is depressurized, the control pressure branch lines can also be depressurized and therefore the traction drive control valve cannot be actuated. Additionally, in the event of damage to the control pressure branch lines and thus a drop in pressure in the control pressure branch lines, the brake line is also depressurized, whereupon the parking brake device is pressurized in the direction of the braking position. The vehicle can thus be operated safely.

The parking brake valve is also appropriately realized in the form of a pressure reducing valve. When the control pressure line is connected to the delivery branch line, the pressure to release the parking brake device can be limited in a simple manner.

It is particularly advantageous if the load pressure signal line of the throttle valve contains a pressure relief valve that guarantees that the pressure will remain below a maximum allowable pressure. It thereby becomes possible to limit the maximum pressure of the drive system in a simple manner.

It is also advantageous if, in the load pressure signal line of the steering system, there is a pressure relief valve that limits the maximum pressure. The maximum allowable pressure of the steering system can thus be set independently of the maximum allowable pressure of the hydraulic work system.

In one embodiment of the invention, there is an electronic control device that is effectively connected to a speed control device for the prime mover, and the speed is controlled as a function of the setpoints of the traction drive system and/or of the hydraulic work system. The speed of the prime mover and thus of the pump can therefore be set independently of the actuation of the traction drive system and of the hydraulic work system. The quantity delivered by the pump can therefore be adapted to various operating conditions by increasing the speed of the prime mover.

It is particularly advantageous if the pressure reducing valves for the actuation of the traction drive control valve can be electrically or electronically actuated in the direction of an increase in the control pressure and are effectively connected to the electronic control device. It thereby becomes possible in a simple manner to set the control pressure in the control pressure branch lines for the actuation of the traction drive control valve. In addition, it becomes possible in a simple manner to pressurize the pressure reducing valve in the direction of a decrease in the control pressure in the event of a current failure, whereupon the traction drive control valve is deflected into the middle position and the traction drive system is blocked. The vehicle can thus be operated safely.

It is appropriate for this purpose if the actuator element for the actuation of the traction drive control valve has a sensor device which is connected with the electronic control device. The actuator element thereby makes available a setpoint signal, corresponding to which the electronic control device actuates the pressure reducing valves and thus the traction drive control valve is actuated.

It is also particularly appropriate if, on the directional control valves of the hydraulic work system, there are sensor devices that detect the deflection of the valves. The speed of the prime mover can thus be modified to correspond to the setpoints supplied by the sensor devices when the hydraulic work system is actuated.

In one embodiment of the invention, the electronic control device has a reducing regulator, whereby there is a sensor device that measures the actual speed of the prime mover. The setpoint speed of the prime mover set on the speed control device can thus be compared to the actual speed measured by the sensor device. When the speed of the prime mover is reduced, depressurization measures can therefore be initiated.

It is particularly advantageous if the control surface of the demand flow regulator acting in the direction of a reduction in the quantitative delivery of the pump can be connected to the control pressure line by means of a branch line, whereby in the branch line leading to the demand flow regulator there is an electrically or electronically actuated pressure reducing valve that is effectively connected to the electronic control device. The setting of the pump in the direction of a reduction in the delivery flow can thereby be changed by the electronic control device, whereby the prime mover can be depressurized, for example in the event of a reduction in speed.

In one embodiment of the invention, it is advantageous if a branch line in connection with the control surface acting in the closing direction of the flow regulator located in the delivery line branches off from the control pressure line, in which branch line there is a pressure reducing valve that generates a control pressure that pressurizes the flow regulator in the closing direction as a function of the actuation of the hydraulic work system and/or of the steering system. With such a pressure reducing valve, the initial pressure of which pressurizes the control surface of the flow regulator acting in the closing direction, the inlet of the traction drive control valve can be easily reduced as a function of the actuation of the hydraulic work system and/or of the steering system, and the flow regulator can also be used as a priority valve for the steering system and the hydraulic work system.

In this case, it is particularly advantageous if the pressure reducing valve is realized in the form of an electrically or electronically actuated pressure reducing valve that is effectively connected to the electronic control device. When the hydraulic work system is actuated, the electronic control device, by means of the sensor devices that detect the deflection of the directional control valves, can determine the hydraulic fluid requirement for the hydraulic work system. If the hydraulic fluid demand required by the traction drive system and the hydraulic work system exceeds the delivery flow that can be delivered by the pump, the inlet of the traction drive system can be reduced by an actuation of the pressure reducing valve and thus a pressurization of the flow regulator in the closing direction. In addition, by means of an electrically or electronically actuated pressure reducing valve, when the speed of the prime mover drops, the flow controller can be pressurized into the closed position, as a result of which the traction drive motor is switched into a freewheeling condition and thus the prime mover is depressurized.

It is particularly advantageous if the pressure reducing valve has a piston-cylinder system, by means of which a control pressure that pressurizes the flow regulator in the closing direction can be generated. The inlet to the traction drive system can also be reduced as a function of the actuation of the steering system and the hydraulic work system.

In this case, it is particularly appropriate if the piston-cylinder system has a piston that can be displaced longitudinally in a housing, which piston acts by means of an actuator on a valve element of the pressure reducing valve, whereby on the end surface of the piston there is a first active surface that acts in the sense of an increase in the control pressure and a second active surface that acts in the sense of a decrease in the control pressure. The first active surface can be pressurized by the load pressure of the hydraulic work system and/or of the steering system and a spring, and the second active surface can be pressurized by the pressure in the delivery line upstream of the flow regulator. When the steering system and the traction drive system are actuated simultaneously, the inlet to the traction drive system can also be reduced if the demand for hydraulic fluid exceeds the delivery capacity of the pump. Consequently, under all operating conditions a shortage of hydraulic fluid in the steering system is prevented and the steering system is supplied with hydraulic fluid. The vehicle therefore remains steerable at all times. The actuation of the steering system and/or of the hydraulic work system is thereby detected by the corresponding load pressure. The load pressure signal from the steering system or the hydraulic work system thereby counteracts the delivery pressure of the pump at the piston. As soon as the load pressure of the steering system or of the hydraulic work system and the force of the spring exceed the delivery pressure of the pump, the piston is deflected in the direction of an increase in the control pressure and thus the flow regulator is pressurized in the closing direction. The inlet to the traction drive system is thereby reduced. In an operating condition in which, in addition to the traction drive system, the steering system or the hydraulic work system is actuated and the demand of the actuated users exceeds the delivery flow of the pump, for example if the load pressure signal of the steering system or the hydraulic work system cannot bring about an increase in the delivery flow of the pump because, for example, the pump is operating at full capacity or the reduction regulator is preventing a further increase in the delivery of the pump, a shortage of hydraulic fluid in the steering system or the hydraulic work system is therefore prevented. It is therefore possible, when faced with a potential shortage of hydraulic fluid in the steering system or the hydraulic work system, to reduce the flow to the traction drive system and thus to supply the steering system and the hydraulic work system with hydraulic fluid with priority over the traction drive system.

It is advantageous if a load pressure signal line leads to the first active surface, whereby the output of a shuttle valve is connected to the load pressure signal line, and the shuttle valve is connected on the input side to the load pressure signal line of the steering system and the load pressure signal line of the hydraulic work system. It is thereby possible in a simple manner to guide the load pressure of the hydraulic work system or of the steering system to the piston-cylinder system.

It is particularly advantageous if the flow regulators are integrated into the throttle valve. The flow regulators thereby take up less space. In addition, the construction is simpler and more economical because the control pressure lines for the pressurization of the flow regulators can be located in the throttle valve.

It is particularly advantageous if, in the inlet line to the hydraulic work system, there is an inlet pressure compensator that can be pressurized in the direction of an open position by the force of a spring and the load pressure of the hydraulic work system, and in the direction of a closed position by the pressure in the inlet line downstream of the inlet pressure compensator. The inlet pressure compensator thus closes the inlet to the hydraulic work system if no users in the hydraulic work system are actuated. The delivery flow to the traction drive system is not thereby reduced when the hydraulic work system is not actuated.

A complete understanding of the invention will be obtained from the following description when taken in connection with the accompanying drawing figures wherein like reference characters identify like parts throughout.

BRIEF DESCRIPTION OF THE DRAWINGS

Additional advantages and details of the invention are explained in greater detail below with reference to the exemplary embodiments illustrated in the accompanying schematic drawings, in which.

DESCRIPTION OF THE PREFERRED EMBODIMENTS

Figure 1:
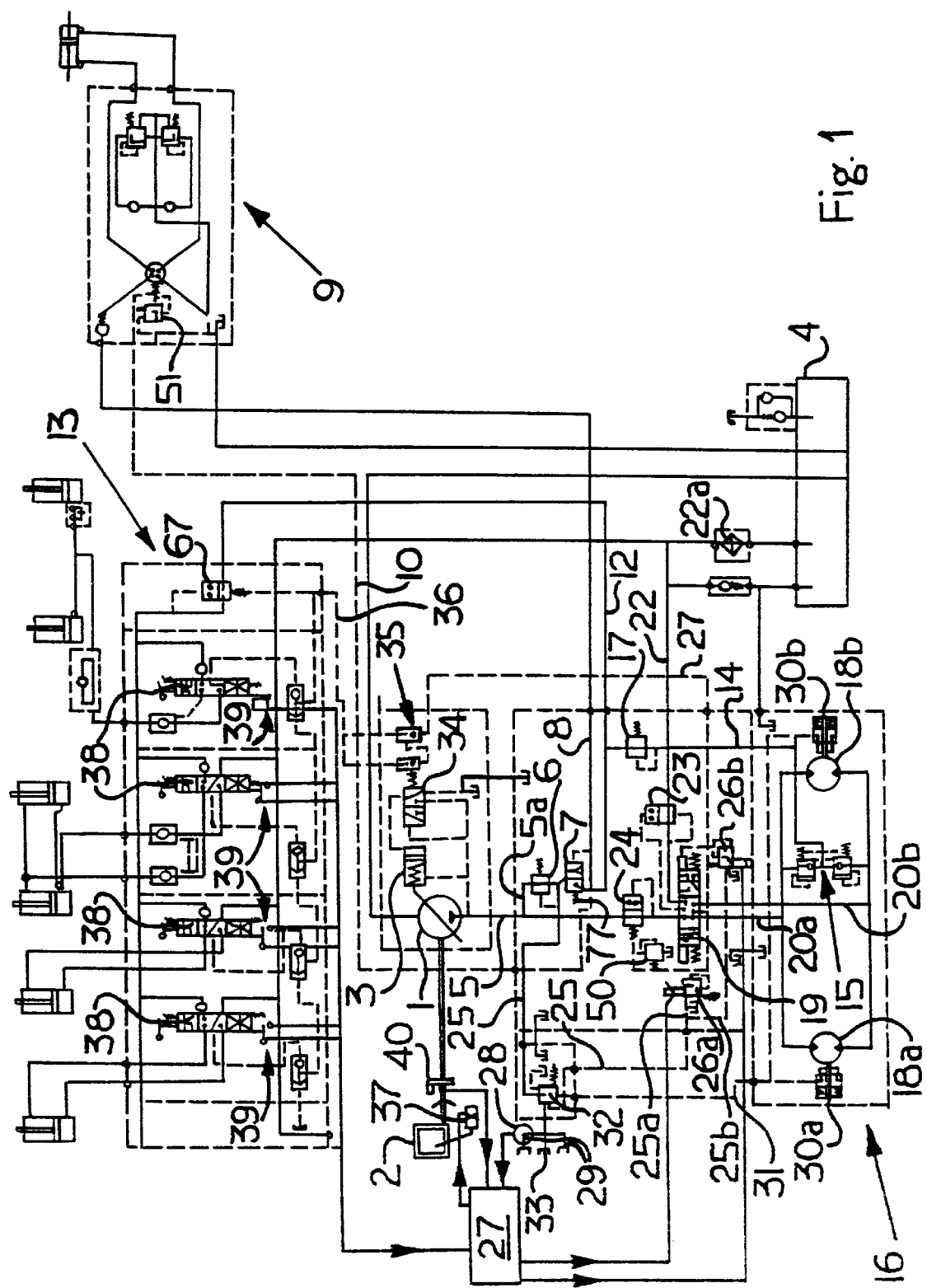
FIG. 1 is a circuit diagram of a drive system of the invention.

For purposes of the description hereinafter, the terms "right", "left", "top", "bottom", "front", "rear" and derivations thereof shall relate to the invention as it is oriented in the drawing figures. However, it is to be understood that the invention may assume various alternative variations and step sequences, except where specified to the contrary. It is also to be understood that the specific devices illustrated in the attached drawings, and described in the following specification, are simply exemplary embodiments of the invention. Hence, specific physical characteristics related to the embodiments described herein are not to be considered as limiting.

As shown in FIG. 1 of the drawings, the drive system of the invention has a pump 1 which is driven by a prime mover 2, such as an internal combustion engine. The delivery volume of the pump 1 is set by means of a spring-loaded piston-cylinder system 3 that acts on the adjustment device of the pump 1. The pump 1 works in an open circuit and sucks hydraulic fluid out of a reservoir 4 and feeds into a delivery line 5. In this case, the reservoir 4 is thereby under a certain initial pressure.

Connected to the delivery line 5 there is a delivery branch line 5a, in which there is a pressure reducing valve 6. By means of the pressure reducing valve 6, the pressure in the delivery branch line 5a can be limited to a value less than the pressure in the delivery line 5. Downstream of the pressure reducing valve 6 is a priority valve 7 which, in the illustrated position, connects the delivery branch line 5a with the inlet line 8 of a steering system 9, preferably a load-sensing steering system. In this switching position, the delivery current in the delivery branch line 5a of the pump 1 is fed exclusively to the steering system 9. The priority valve 7 can be pressurized in the direction of this switching position by a load pressure of the steering system 9 carried in a load pressure signal line 10 and by the force of a spring 11. The priority valve 7 can be pressurized in the direction of the switching position illustrated on the right in the figure by the pressure in the inlet line 8. As soon as the pressure difference between the inlet line 8 and the load pressure signal line 10 has reached a level sufficient to overcome the force of the spring 11, the priority valve 7 is pressurized into the switching position illustrated on the right in the figure. In this switching position, the delivery branch line 5a is connected to the inlet line 8 of the steering system 9 and the inlet line 12 of the hydraulic work system 13. To limit the maximum pressure in the steering system 9, there is a pressure relief valve 51 provided in the load pressure signal line 10 and set to the maximum pressure of the steering system 9.

Branching off from the inlet line 12 of the hydraulic work system 13 is a feed line 14 which is connected to a feeder device 15 of a traction drive system 16. In the feed line 14 there is a pressure reducing valve 17, by means of which the pressure in the feed line 14 can be limited.

The feeder device 15 consists of combined pressure relief and anti-cavitation valves, by means of which, on one hand, the traction drive system 16 is protected against an overload by means of the pressure relief valves, and on the other hand against cavitation by means of the anti-cavitation valves. The traction drive system 16 has two traction motors 18a, 18b, for example, with a constant delivery volume. However, the traction motors can also be realized with an adjustable delivery volume.

In the delivery line 5, downstream of the branch connection for the delivery branch line 5a, there is a traction drive control valve 19. Connected to the traction drive control valve 19 are secondary delivery lines 20a, 20b which lead to the connections of the traction motors 18a, 18b. Also connected to the traction drive control valve 19 is a load pressure signal line 21, which detects the load pressure of the traction motors 18a, 18b downstream of the traction drive control valve 19. The traction drive control valve 19 is also connected to an outlet line 22 that leads to the reservoir 4, in which there is a cooler 22a. The traction drive control valve 19 is preferably realized in the form of a directional control valve that throttles in intermediate positions, with a closed middle position. Located in the outlet line 22 is a flow regulator 23, which can be pressurized in the direction of an open position by the pressure in the outlet line 22 upstream of the flow regulator 23 and the force of a spring, and in the closed position by the pressure in the delivery line 20b or 20a and thus by the pressure upstream of the throttle point of the traction drive control valve 19 in the outlet line 22. In the delivery line 5, downstream of the branch connection for the delivery branch line 5a, there is also a flow regulator 24 which can be pressurized in the direction of a closed position by the pressure in the delivery line 5 downstream of the flow regulator 24 and in the direction of an open position by the pressure downstream of the throttle point of the traction drive control valve 19 and thus of the load pressure of the traction motors 18a, 18b, and by a spring. For this purpose, the load pressure signal line 21 leads to the control surface of the flow regulator 24 acting in the direction of the open position. The flow regulator 23 is thus controlled by the pressure drop that occurs at the outlet orifice, and the flow regulator 24 is controlled by the pressure drop of the traction drive control valve 19 that occurs at the inlet orifice. In the load pressure signal line 21 there is a pressure relief valve 50 that is set to the maximum pressure of the traction drive system 16.

In the illustrated middle position of the traction drive control valve 19, the connections are closed, whereby the traction drive system 16 is blocked. In the switching positions illustrated on the left and right of the figure, the delivery line 5 is connected with the delivery lines 20a and 20b and the return or outlet line 22 is connected with the delivery lines 20b and 20a, as a result of which the traction motors 18a, 18b can be operated in both directions.

The actuation of the traction drive control valve 19 takes place as a result of a control pressure carried in control pressure branch lines 25a, 25b. The control pressure branch lines 25a, 25b branch off from a control pressure line 25 which is connected to the delivery branch line 5a downstream of the pressure reducing valve 6.

To generate a control pressure, in the control pressure branch lines 25a, 25b there are respective pressure reducing valves 26a and 26b. The pressure reducing valves 26a, 26b can be actuated electrically and for this purpose are effectively connected to an electronic control device 27. The electronic control device 27 is also connected to a sensor device 28 which detects the deflection of an actuator element 29, such as a two pedal system, for example, and in the event of a deflection of the actuator element 29, the electronic control device 27 actuates the corresponding pressure reducing valves 26a, 26b, as a result of which the control surface of the traction drive control valve 19 is pressurized with control pressure and thus the traction drive control valve 19 is deflected.

On each of the traction motors 18a, 18b there is a parking brake device 30a and 30b, for example a spring-loaded brake, respectively, which can be released by means of a pressure available in a brake line 31. The brake line 31 is connected to the control pressure line 25, whereby upstream of the connection of the brake line 31 to the control pressure line 25 there is a parking brake valve 32. The parking brake valve 32 can be actuated by means of an actuator element 33, such as a brake pedal. The parking brake valve 32 is realized in the form of a pressure reducing valve and can be connected to a reservoir. As a result, the pressure in the control pressure branch lines 25a, 25b and in the brake line 31 can be limited.

When the actuator element 33 is actuated, the control pressure branch lines 25a, 25b and the brake line 31 are connected with the reservoir, as a result of which the parking brake device 30a, 30b engages as a result of the force of the spring, and the vehicle is braked. As a result of the connection of the control pressure branch lines 25a, 25b with the brake line 31, when the parking brake device 30a, 30b is in the braking position, the traction drive control valve 19 cannot be actuated. When the actuator element 33 of the parking brake device 30a, 30b is actuated, therefore, the traction drive control valve 19 is deflected by the return springs into the middle position and can no longer be actuated, as a result of which the traction drive system 16 is blocked.

The piston-cylinder system 3 of the pump 1 can be pressurized by means of a demand flow regulator 34 that is connected to the delivery line 5. The demand flow regulator 34 can be pressurized in the direction of a reduction of the delivery flow of the pump 1 by the pressure in the delivery line 5. The demand flow regulator 34 can be pressurized in the direction of an increase in the delivery flow by a spring and by the load pressure of the traction drive system 16, the load pressure of the steering system 9 and the load pressure of the hydraulic work system 13. For this purpose there is a system of shuttle valves 35 that is connected to the load pressure signal line 21 of the traction drive system 16, the load pressure signal line 10 of the steering system 9 and a load pressure signal line 36 of the hydraulic work system 13, as a result of which the highest of the connected load pressures is available on the corresponding control surface of the demand flow regulator 34.

The electronic control device 27 is also effectively connected on the outlet side to a speed control device 37 of the prime mover 2. On the input side, the electronic control device 27 is connected with sensor devices 39 located on directional control valves 38 of the hydraulic work system 13, which sensor devices 39 detect the deflection of the directional control valves 38. The hydraulic work system 13 has a directional control valve 38 for each user, e.g. for the lifting cylinder and for the tilting cylinder of a lifting mast of an industrial truck, and for any other users of hydraulic energy that may be installed on the vehicle. There is also a sensor device 40 that measures the current speed of the prime mover 2, and can be located, for example, on the output shaft of the prime mover 2.

In the inlet line 12 of the hydraulic work system 13 there is an inlet pressure compensator 67 which can be pressurized in the opening direction by the pressure in the load pressure signal line 36 of the hydraulic work system 13 and by a spring. In the closing direction, the inlet pressure compensator 67 can be pressurized by the pressure in the inlet line 12 downstream of the inlet pressure compensator 67. The inlet line 12 is thereby closed when the hydraulic work system 13 is not actuated.

The drive system of the invention functions as follows:

In the starting position, the demand flow regulator 34 and the priority valve 7 are in the illustrated positions as a result of the force of the corresponding springs. The pump 1 thereby delivers hydraulic fluid into the delivery line 5 and into the delivery branch line 5a. The priority valve 7 is thereby pressurized into the switching position shown on the right in the figure by the pressure in the inlet line 8 of the steering system 9, as a result of which hydraulic fluid is present in the inlet line 8 of the steering system 9 and in the inlet line 12 of the hydraulic work system 13. The inlet pressure compensator 67 in the inlet line 12 of the hydraulic work system 13 is pressurized in the direction of the closed position. The feed line 14 is also pressurized with hydraulic fluid, as a result of which the feeder device 15 of the traction drive system 16 is supplied with hydraulic fluid. As a result of the pressure increase in the delivery line 5, the demand flow regulator 34 is pressurized into the position shown on the left in the figure and thus the piston-cylinder system 3 is deflected in the direction of a reduction in the delivery flow. In this operating position, the pump 1 generates a pressure defined by the force of the spring of the demand flow regulator 34 to supply the feeder device 15 and the control pressure line 25 and thus to actuate the traction drive control valve 19 and the parking brake device 30a, 30b.

When the steering system 9 is actuated, the equilibrium at the demand flow regulator 34 is disrupted by the load pressure signal of the steering system 9 in the load pressure signal line 10, so that the pump 1 is deflected in the direction of an increase in the delivery flow. The pump 1 thus supplies the instantaneous demand of the steering system 9.

If only the hydraulic work system 13 is actuated, the adjustment device of the pump 1 is also deflected by the load pressure signal in the load pressure signal line 36 in the direction of an increase in the delivery flow, so that the pump 1 delivers hydraulic fluid to meet the demand of the hydraulic work system 13. By means of the sensor devices 39, the deflection of the directional control valves 38 is also detected, so that the speed of the prime mover 2 can be increased by means of the speed control device 37 as a function of the actuation of the directional control valves 38. The inlet pressure compensator 67 is pressurized into the open position by the pressure signal in the load pressure signal line 36, so that hydraulic fluid can flow to the users in the hydraulic work system 13.

When the actuator element 29 is deflected, the electronic control device receives a signal by means of the sensor device 28, which can be a potentiometer, for example, and actuates the pressure reducing valves 26a, 26b so that a control pressure is generated in the control pressure branch lines 25a and 25b, and the traction drive control valve 19 is deflected by the sensor device 28 into the appropriate position corresponding to the setpoint for the direction and speed of travel. The electronic control device 27 can continue to increase the speed of the prime mover 2. In response to the load pressure signal in the load pressure signal line 21, the pump 1 delivers the flow demanded by the traction drive system 16. If, during the acceleration of the prime mover 2, there is a reduction in the speed of the prime mover 2, the electronic control device 27 moves the traction drive control valve 19 back in the direction of the middle position, until the overload of the prime mover 2 has been eliminated.

When the vehicle is traveling downhill, the pressure conditions at the traction motors 18a, 18b are reversed, as a result of which the traction motors 18a, 18b function as pumps and suck hydraulic fluid out of the delivery line 5 and deliver it into the return line 22. In this case, the traction motors 18a, 18b attempt to deliver a larger quantity of hydraulic fluid via the outlet-side throttle point of the traction drive control valve 19 formed by the outlet orifice of the traction drive control valve 19 than corresponds to the setpoint speed set at the throttle point, as a result of which the flow regulator 23 is pressurized in the direction of the closed position. The flow regulator 23 hereby builds up a braking pressure which keeps the vehicle at the speed set at the outlet-side throttle point of the traction drive control valve 19.

During the deceleration of the vehicle in response to the retraction of the actuator element 29, the traction drive control valve 19 is deflected by the electronic control device 27 in the direction of the middle position. The sequences described above occur, as a result of which the flow regulator 23 builds up a braking pressure and the vehicle is operated at the speed currently set at the traction drive control valve 19.

When the traction drive control valve 19 is actuated, the electronic control device 27 governs the acceleration and the deceleration of the vehicle, because there are acceleration and deceleration ramps provided in the electronic control device 27. During the deceleration, the speed of the prime mover 2 is reduced to correspond to the braking deceleration. When the vehicle is stationary, i.e., when the traction drive control valve 19 is in the middle position, the traction drive system 16 is blocked.

When the vehicle is in motion, if the steering system 9 is actuated, the pump 1 also delivers to meet the demand of the steering system. For example, if the load pressure of the steering system 9 is less than the load pressure of the traction drive control valve 19, the equilibrium at the demand flow regulator 34 is disrupted by the drop in pressure in the delivery line 5, which is caused by the outflow of hydraulic fluid into the inlet line 8 of the steering system 9. The pump 1 is thereby deflected in the direction of an increase in the delivery flow, until equilibrium is re-established at the demand flow regulator 34. If the load pressure of the steering system 9 exceeds the load pressure of the traction drive system 16, the load pressure signal of the steering system 9 is available on the spring side of the demand flow regulator 34, as a result of which the pump 1 is deflected in the direction of an increase in the delivery flow. The flow regulator 24 in the inlet of the traction drive system 16 thereby prevents the vehicle from being operated at a higher speed by regulating the flow through the inlet-side throttle point of the traction drive control valve 19. If there is a decrease in the speed of the prime mover 2, only the speed of the vehicle is reduced by a retraction of the traction drive control valve 19.

The delivery of the pump 1 is thereby designed so that at the maximum speed of travel, the pump 1 can be deflected in the direction of an increase in the delivery flow and thus an additional flow of hydraulic fluid is available for the steering system 9, the hydraulic work system 13 and the feeder device 15.

If the hydraulic work system 13 is actuated while the vehicle is in motion, the pump 1—as described above—also delivers hydraulic fluid to meet the demand of the hydraulic work system 13, if and to the extent that the delivery volume of the pump can be increased to meet the demand for hydraulic fluid. In this case, the hydraulic work system 13 is supplied with hydraulic fluid after the steering system 9 and the feeder device 15, and before the traction drive system 16. The electronic control device 27 can calculate the total delivery demand of the traction drive system 16 and the hydraulic work system 13 on the basis of the setpoint signals of the sensor devices 28 and 39, and to increase the delivery flow of the pump 1, it can increase the speed of the prime mover 2 to the maximum speed.

If there is a shortage of hydraulic fluid on the inlet side of the traction drive system 16 when the traction drive system 16 and the steering system 9, or the traction drive system 16 and the hydraulic work system 13, are actuated simultaneously, the hydraulic fluid deficit on the suction side of the traction motors 18a, 18b is made up by the feeder device 15. The traction drive system is then in a coasting status, in which the vehicle continues to roll unpowered and under its own kinetic energy.

Figure 2:
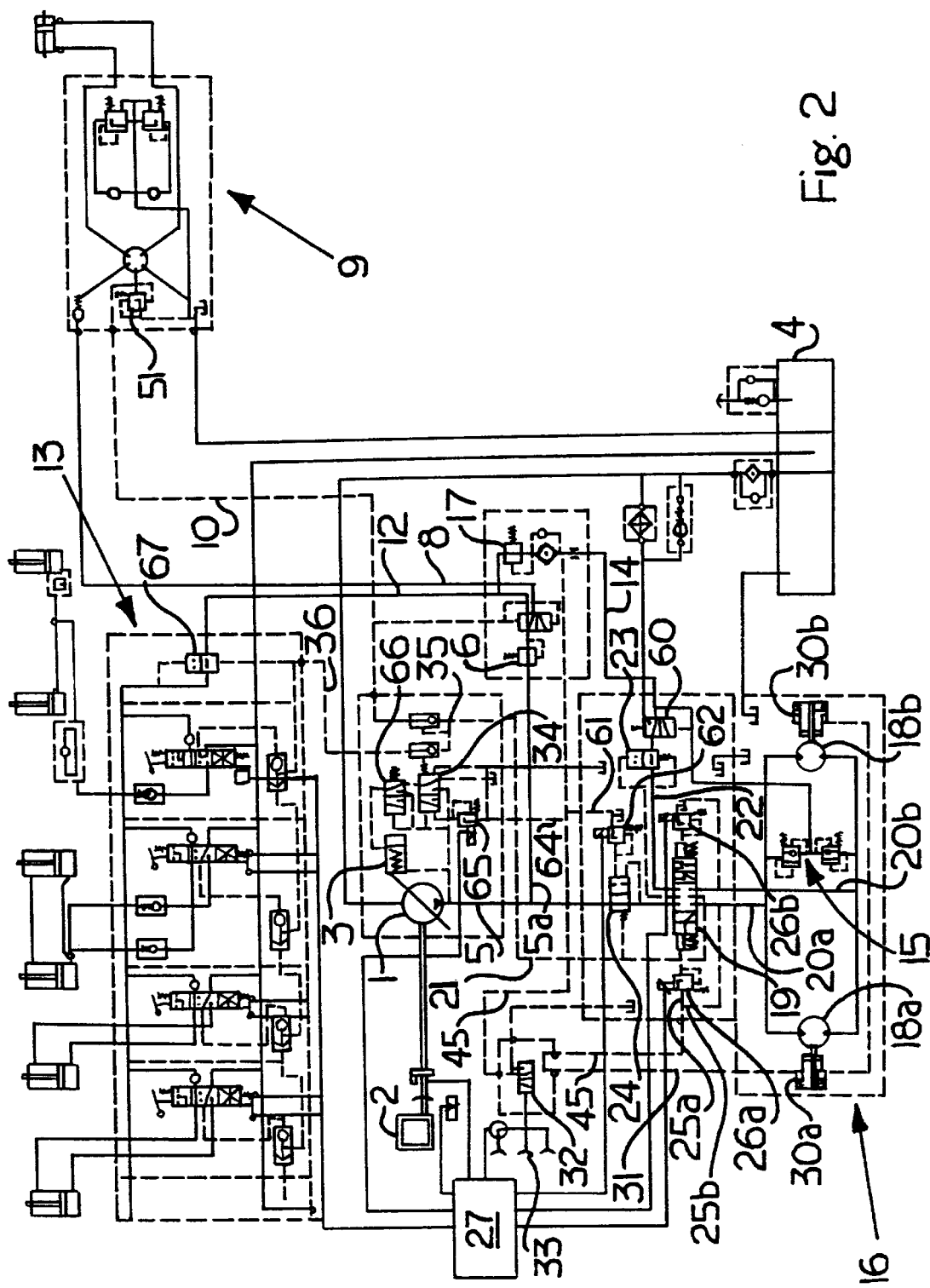
FIG. 2 illustrates another embodiment of the drive system of the invention.

FIG. 2 illustrates an additional embodiment of the drive system illustrated in FIG. 1. Similar components as in the embodiment of FIG. 1 are identified by the same reference numbers. The following description relates only to the different and additional elements, and the results they produce.

The circuit diagram of a hydrostatic drive system as illustrated in FIG. 2 has a valve 60 in the outlet line 22 of the traction drive control valve 19, downstream of the flow regulator 23, which valve 60, in the illustrated position, closes the connection between the outlet line 22 and the reservoir 4 and connects the outlet line 22 with the feed line 14. In the position illustrated in the bottom of FIG. 2, the outlet line 22 can be connected with the reservoir 4. The valve 60 is spring-loaded in the direction of the illustrated position, and can be pressurized in the opposite direction by the pressure in the feed line 14. As soon as the pressure in the feed line 14 is less than the value of the spring force, hydraulic medium from the outlet line 22 can therefore flow in the feeder device 15.

When a number of users are actuated simultaneously, for example the actuation of the traction drive system 16 and the hydraulic work system 13, or when the traction drive system 16 switches from traction to coasting operation, operating conditions can occur in which an insufficient quantity of hydraulic fluid flows into the traction drive system 16. Such an operating condition can occur, for example, if in addition to the traction drive system 16, the hydraulic work system 13 and/or the steering system 9 are actuated, and the delivery volume of the pump 1 cannot be increased any further. In this case, the traction drive system 16 has the highest load pressure, so the delivery flow of the pump 1 flows with priority to the steering system 9 and the hydraulic work system 13, whereby there is a shortage of hydraulic fluid on the inlet side of the traction drive system 16. In the event of such an under supply of the traction drive system 16 with hydraulic fluid in the delivery lines 20a or 20b, the pressure in the inlet-side delivery lines 20a or 20b drops and the deficit of hydraulic fluid is made up via the feed line 14 and the feeder device 15. Because the pressure in the feed line 14 also drops as a result of this condition, the valve 60 moves into the illustrated position, as a result of which the outlet line 22 is connected to the feed line 14. Via the feeder device 15, therefore, additional hydraulic fluid flows directly from the outlet side into the inlet side of the traction motors 18a, 18b. The traction drive system 16 is therefore in a coasting status, in which the vehicle continues to roll without propulsion under its own kinetic energy, whereby the delivery flow of the pump 1 is fully available to the steering system 9 and to the hydraulic work system 13 via the connection between the outlet line 22 and the feeder device 15.

A control pressure line 45, which is connected to the control pressure branch lines 25a, 25b, is connected to the feed line 14, as a result of which, in the control pressure line 25, the pressure level is reduced by the pressure reducing valve 17. Consequently, the parking brake valve 32 can be realized in the form of a two-position valve which, in the illustrated position, connects the control pressure line 45 with the brake line 31 and the control pressure branch lines 25a, 25b. When the actuator element 33 is actuated, the parking brake valve 32 is in the position illustrated on the left in the figure, in which the control pressure line 45 is connected downstream of the parking brake valve 32 with a reservoir and thus the pressure in the control pressure branch lines 25a, 25b and the brake line 31 is reduced. The parking brake device 30a, 30b is moved into the braking position by the force of the springs. In this position, the traction drive control valve 19 cannot be actuated and is in the neutral position as a result of the return springs.

The control surface of the inlet-side flow regulator 24 acting in the closing direction is connected by means of a branch line 61 to the control pressure line 45. In the branch line 61 there is a pressure reducing valve 62 that is effectively connected to the electronic control device 27, and the output pressure of which can be set as a function of the actuation by the electronic control device 27. Consequently, when the pressure reducing valve 62 is actuated by the electronic control device 27, a control pressure is generated that also pressurizes the flow regulator 24 in the closing direction. The inlet of the traction drive control valve 19 can therefore be overmodulated, whereby, for example, the flow of hydraulic fluid to the traction drive control valve 19 can be reduced in the event of a speed reduction of the prime mover 2. It is also possible to reduce the inlet to the drive motors under operating conditions in which, in addition to the traction drive system 16, the hydraulic work system 13 is actuated and the flow of hydraulic fluid demanded by the users exceeds the delivery flow that can be supplied by the pump 1. It thereby becomes possible to prevent a deficit of hydraulic fluid at the hydraulic work system 13, thereby ensuring that the hydraulic work system 13 can be supplied with hydraulic fluid and can thus be operated under all operating conditions.

An additional branch line 64 branching off from the control pressure line 45 leads to the control surface of the demand flow regulator 34 that acts in the direction of a reduction in the delivery of the pump 1. In the branch line 64, there is a pressure reducing valve 65 that can be actuated by the electronic control device 27 and by means of which it is possible to actuate the demand flow regulator 34, if the pressure reducing valve 62 is actuated. Thus, in the event of a reduction in the speed of the prime mover 2, the adjustment device of the pump 1 can be deflected in a simple manner to bring about a reduction in the delivery flow.

In place of the pressure relief valve 50 in the load pressure signal line 21 of the traction drive system 16 as illustrated in FIG. 1, there is a valve 66 located downstream of the demand flow regulator 34. The valve 66 can be pressurized in the direction of a reduction in the delivery flow of the pump 1 by the pressure in the delivery line 5 and in the direction of an increase in the delivery flow by the force of a spring. In this case, the spring is set to the maximum pressure of the traction drive system 16. When the maximum pressure in the delivery line 5 is exceeded, the valve 66 can thus be deflected against the force of the spring and the pump 1 can be deflected in the direction of a reduction in the delivery flow. It thereby becomes possible to cut the pressure which, in contrast to FIG. 1, can also be done when the traction drive system 16 is not actuated.

Figure 3:
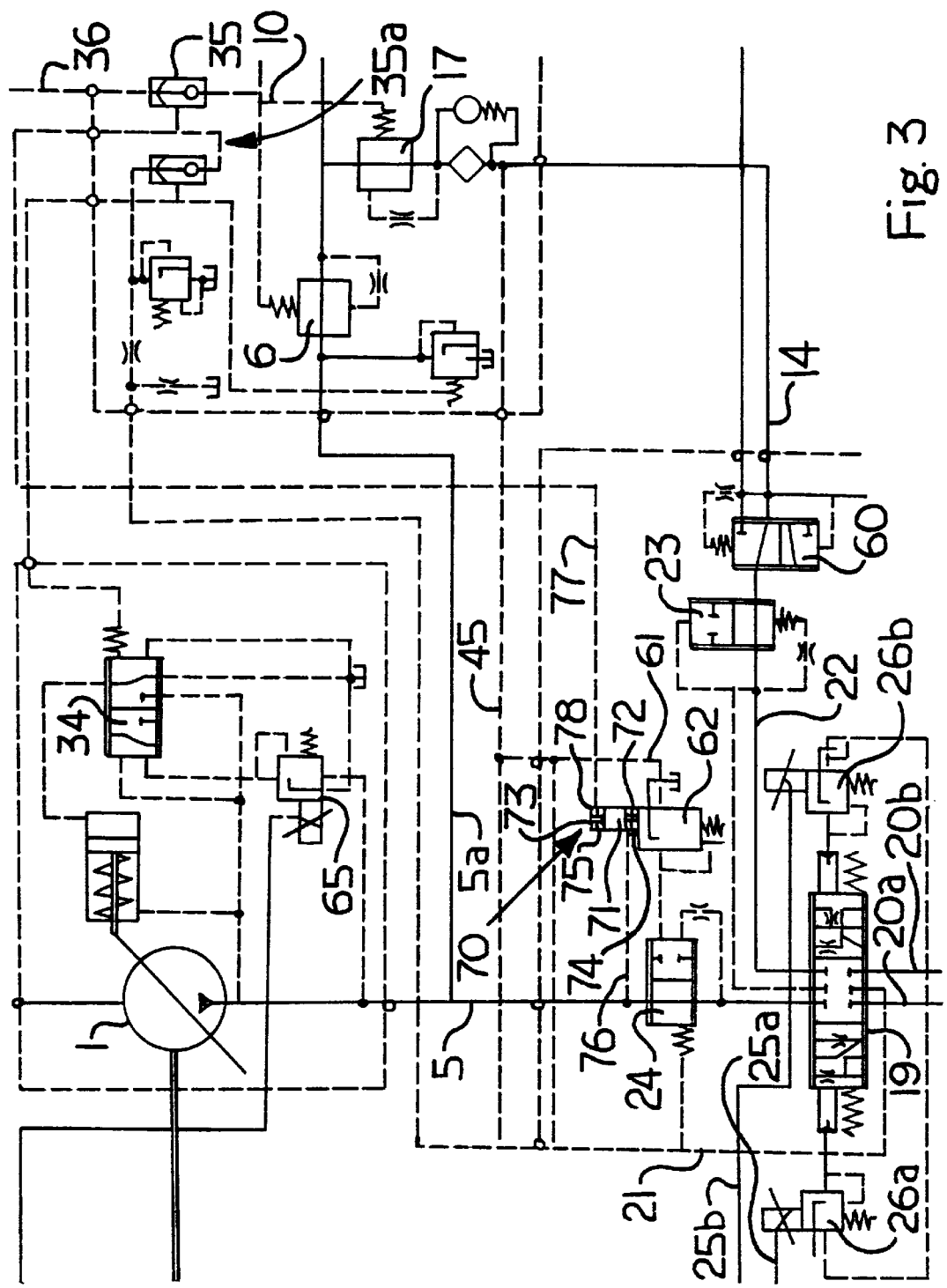
FIG. 3 illustrates an additional embodiment of the drive system.

FIG. 3 illustrates a refinement of the drive system illustrated in FIG. 2. In this case, only a portion of the circuit diagram is shown. Components that are similar to those in FIG. 2 are identified by the same numbers in FIG. 3.

In this case, the pressure reducing valve 62 is provided with a piston-cylinder system 70, the piston 71 of which, by means of an actuator element 72, pressurizes a valve element of the pressure reducing valve 62 and thus generates a control pressure in the branch line 61 which pressurizes the flow regulator 24 in the closing direction. The piston 71 is mounted so that it can move longitudinally in a housing 73 and on its end surfaces forms opposite active surfaces 74, 75 which are preferably of the same size. The active surface 74 pressurizes the pressure reducing valve in the direction of a reduction in the control pressure and the active surface 75 pressurizes the pressure reducing valve in the direction of an increase in the control pressure. In this case, the active surface 74 can be pressurized by the pressure in the delivery line 5, for which purpose a control pressure line 76 leads from the delivery line 5 to the control compression chamber formed by the active surface 74 and the housing 73. The control compression chamber formed by the active surface 75 and the housing 73 is connected to a load pressure signal line 77 which leads to the output of the shuttle valve 35 in the shuttle valve system 35*a*. On the input side, the shuttle valve 35 is connected to the load pressure signal line 10 of the steering system 9 and the load pressure signal line 36 of the hydraulic work system 13. There is also a spring 78 in the control compression chamber formed by the active surface 75 and the housing 73.

When the traction drive control valve 19 is actuated and the delivery flow of the pump cannot be increased any further, for example when the pump 1 is set to the maximum delivery flow or when the speed of the prime mover 2 cannot be increased any further, it may happen when the steering system 9 or the hydraulic work system 13 is also actuated that too little hydraulic fluid will be supplied to the hydraulic work system 13 or to the steering system 9. Such a shortage of hydraulic fluid in the hydraulic work system 13 or the steering system 9 occurs if the load pressure signal of the steering system or of the hydraulic work system 13 exceeds the load pressure signal of the pump 1, whereby the pump 1 can no longer increase the delivery volume to correspond to the load pressure signal of the steering system 9 or of the hydraulic work system 13. The load pressure signal of the steering system 9 or of the hydraulic work system 13 is available in the load pressure signal line 77, however, and pressurizes the active surface 75 of the piston-cylinder assembly 70. As soon as the load pressure signal in the load pressure signal line 77 and the force of the spring 78 exceed the delivery pressure of the pump available at the active surface 74, the pressure reducing valve 62 generates a control pressure that pressurizes the flow regulator 24 into the closed position. The admission to the traction drive system 16 is thereby reduced.

The pressure reducing valve 62 for pressurization of the control surface of the inlet-side flow regulator 23 of the traction drive control valve 19 acting in the closing direction can thereby be actuated as a function of the actuation of the steering system 9 and of the hydraulic work system 13. The admission to the traction drive control valve 19 can thus be reduced as a function of the actuation of the steering system 9 and the hydraulic work system 13. It thereby becomes possible to prevent an under-supply of hydraulic fluid to the steering system 9 and to the hydraulic work system 13 by reducing the admission to the traction drive system 16. Compared to the drive system illustrated in FIG. 2, it is thereby possible to supply the steering system 9 with hydraulic fluid under all operating conditions and thus to keep the vehicle steerable at all times.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

I claim:

1. A hydrostatic drive system for a vehicle having a hydrostatic traction drive system, a hydraulic work system and a hydraulic steering system in an open circuit, comprising:

a hydraulic pump with an adjustable delivery volume to supply the traction drive system, the hydraulic work system and the steering system;

a delivery line, wherein the pump discharges into the delivery line;

a traction drive control valve in the delivery line for pressurization of the traction drive system, wherein the traction drive control valve is connected to an outlet line leading to a reservoir and is connected to delivery lines leading to the traction drive system;

and flow regulators located in both the delivery line and in the outlet line, each flow regulator pressurized by the pressure upstream of a throttle point of the traction drive control valve in a closing direction, and by the pressure downstream of the throttle point of the traction drive control valve and by a spring in an open direction.

2. The hydrostatic drive system as claimed in claim 1, wherein the traction drive control valve is a throttling, spring-centered directional control valve with a closed middle position and open outer positions which have an inlet and an outlet orifice.

3. The hydrostatic drive system as claimed in claim 2, wherein the inlet orifice and the outlet orifice of the traction drive control valve are substantially the same size.

4. The hydrostatic drive system as claimed in claim 2, including a precision control range on the traction drive control valve in which the outlet orifice is smaller than the inlet orifice of the traction drive control valve.

5. The hydrostatic drive system as claimed in claim 2, wherein in a range of maximum deflection of the traction drive control valve, the outlet orifice is larger than the inlet orifice of the traction drive control valve.

6. The hydrostatic drive system as claimed in claim 1, including a delivery branch line in flow communication with the delivery line upstream of the delivery line flow regulator, the delivery branch line in flow communication with the steering system and the hydraulic work system.

7. The hydrostatic drive system as claimed in claim 1, wherein the flow regulator located in the delivery line is pressurized in a closing direction as a function of the actuation of at least one of the hydraulic work system and the steering system.

8. The hydrostatic drive system as claimed in claim 6, including a priority valve for the steering system located in the delivery line branch line, wherein in a first switching position the priority valve connects the delivery branch line with an inlet line of the steering system, and in a second switching position connects the delivery branch line with the inlet line of the steering system and with an inlet line of the hydraulic work system, wherein the priority valve is pressurized in the direction of the first switching position by a spring and the load pressure of the steering system and in the direction of the second switching position by the pressure in the inlet line of the steering system, and wherein the steering system is a load-sensing steering system.

9. The hydrostatic drive system as claimed in claim 8, including a pressure reducing valve located in the delivery branch line, upstream of the priority valve of the steering system.

10. The hydrostatic drive system as claimed in claim 6, including a feeder device for the hydrostatic drive system, wherein a feed line of the feeder device is connected to at least one of an inlet line of the hydraulic work system and the delivery branch line.

11. The hydrostatic drive system as claimed in claim 10, including a pressure reducing valve in the feed line of the feeder device.

12. The hydrostatic drive system as claimed in claim 1, including a demand flow regulator connected to an adjustment device of the pump, which demand flow regulator is pressurized in the direction of a reduction in the delivery flow of the pump by the pressure in the delivery line, and in the direction of an increase in the delivery flow by the highest load pressure signal of the traction drive system, the hydraulic work system and the steering system.

13. The hydrostatic drive system as claimed in claim 10, including a valve located in the outlet line of the traction drive control valve downstream of the outlet line flow regulator, which valve, in a first switching position, connects the outlet line with the reservoir, and in a second switching position connects the outlet line with the feed line, wherein the valve is pressurized in the direction of the second switching position by a spring, and is pressurized in the direction of the first switching position by the pressure in the feed line.

14. The hydrostatic drive system as claimed in claim 1, wherein the traction drive control valve is hydraulically actuated, and wherein the drive system includes control pressure branch lines connected to respective control surfaces of the traction drive control valve, with pressure reducing valves located in control pressure branch lines, with pressure reducing valves configured to generate a control pressure as a function of the deflection of an actuator element.

15. The hydrostatic drive system as claimed in claim 14, wherein the control pressure branch lines are connected to a control pressure line that is connected to a delivery branch line downstream of a pressure reducing valve in the delivery branch line.

16. The hydrostatic drive system as claimed in claim 14, wherein the control pressure branch lines are connected to a control pressure line and the control pressure line is connected to a feed line downstream of a pressure reducing valve in the feed line.

17. The hydrostatic drive system as claimed in claim 1, including a parking brake device for the traction drive system, which parking brake device has a parking brake valve and a brake line leading to the parking brake device, wherein the parking brake device is releasable by a pressure available in the brake line.

18. The hydrostatic drive system as claimed in claim 17, wherein the parking brake valve is actuated by an actuator element and is located in a control pressure line, and wherein the brake line is connected to the control pressure line downstream of the parking brake valve.

19. The hydrostatic drive system as claimed in claim 18, wherein the parking brake valve, in a first switching position, connects the control pressure line with control pressure branch lines connected to the throttle valve and with the brake line, and in a second switching position connects the control pressure branch lines and the brake line with a reservoir.

20. The hydrostatic drive system as claimed in claim 17, wherein the parking brake valve is a pressure reducing valve.

21. The hydrostatic drive system as claimed in claim 1, including a pressure relief valve located in a load pressure signal line for the traction drive system to prevent exceeding a maximum allowable pressure.

22. The hydrostatic drive system as claimed in claim 1, including a pressure relief valve in a load pressure signal line of the steering system to prevent exceeding a maximum allowable pressure.

23. The hydrostatic drive system as claimed in claim 1, including an electronic control device connected to a speed control device of a prime mover, which electronic control device controls the speed of the prime mover as a function of the actuation of at least one of the traction drive control valve and the hydraulic work system.

24. The hydrostatic drive system as claimed in claim 23, including electronically actuated pressure reducing valves to actuate the traction drive control valve in the direction of an increase in the control pressure, which electronically actuated pressure reducing valves are connected to the electronic control device.

25. The hydrostatic drive system as claimed in claim 24, including an actuator element for the actuation of the traction drive control valve having a sensor device connected to the electronic control device.

26. The hydrostatic drive system as claimed in claim 23, including directional control valves located in the hydraulic work system having sensor devices that detect deflection of the directional control valves.

27. The hydrostatic drive system as claimed in claim 23, wherein the electronic control device has a reduction regulator and a sensor device which sensor device measures the speed of the prime mover.

28. The hydrostatic drive system as claimed in claim 23, including a demand flow regulator having a control surface that acts in the direction of a reduction of the pump delivery connected to a control line by a branch line, wherein in the branch line there is an electronically actuated pressure reducing valve connected to the electronic control device.

29. The hydrostatic drive system as claimed in claim 7, including a control pressure line with a branch line that is connected to a control surface acting in the closing direction of a flow regulator located in the inlet of the traction drive control valve, in which branch line there is a pressure reducing valve which is pressurized as a function of at least one of the actuation of the steering system and the hydraulic work system and generates a control pressure that pressurizes the flow regulator in the closing direction.

30. The hydrostatic drive system as claimed in claim 29, wherein the pressure reducing valve is electronically actuated and is connected to an electronic control device.

31. The hydrostatic drive system as claimed in claim 29, including a pressure reducing valve having a piston-cylinder system for generating a control pressure to pressurize the flow regulator in the closing direction.

32. The hydrostatic drive system as claimed in claim 31, wherein the piston-cylinder system has a piston longitudinally movable in a housing, which piston acts by an actuator element on a valve element of the pressure reducing valve, wherein on an end surface of the piston a first active surface is formed that acts in the direction of an increase in the control pressure and a second active surface that acts in the direction of a decrease in the control pressure, wherein the first active surface is pressurized by the load pressure of at least one of the steering system and the load pressure of the hydraulic work system and by a spring, and the second active surface is pressurized by the pressure in the delivery line upstream of the flow regulator.

33. The hydrostatic drive system as claimed in claim 32, including a load pressure signal line connected to the first active surface, which load pressure signal line is connected to an output of a shuttle valve, which is connected on an input side to a load pressure signal line of the steering system and a load pressure signal line of the hydraulic work system.

34. The hydrostatic work system as claimed in claim 6, wherein the flow regulator is integrated into the traction drive control valve.

35. The hydrostatic drive system as claimed in claim 1, including an inlet line of the hydraulic work system having an inlet pressure balance which is pressurized in the direction of an open position by the force of a spring and a load pressure of the hydraulic work system, and in the direction of a closed position by the pressure in the inlet line of the hydraulic work system.

* * * * *